United States Patent Office 3,679,514
Patented July 25, 1972

3,679,514
PROCESS FOR IMPROVING THE PRODUCTION OF A LAMINATED PLASTIC ID CARD
Roger J. Kuhns, Lincoln, Mass., assignor to Avant Incorporated, Lincoln, Mass.
No Drawing. Filed Aug. 27, 1969, Ser. No. 853,515
Int. Cl. C09j 5/06
U.S. Cl. 156—309                                    2 Claims

ABSTRACT OF THE DISCLOSURE

A process for eliminating die cutting of finished laminated plastic ID cards by providing top and bottom protective sheets having the exact dimensions of the finally produced card and utilizing sparse amounts of adhesive for laminating a data card between the protective top and bottom sheets.

BACKGROUND OF THE INVENTION

This invention relates to the field of laminated plastic ID cards.

Various types of ID cards such as credit cards or badges must be produced having precisely controlled lengths and widths so that this may be inserted into a data processing machine for scanning purposes, or imprinters to create self-writing records. The inner data-bearing sheets have, in all processes known to the inventor, been laminated between *oversized* top and bottom plastic sheets under heat and pressure and thereafter die cut to produce the final card having the required precise dimensions. This decentralized die cutting thus requires one expensive and laborious die cutter (costing up to $500) for each laminator and results in substantial wastage of plastic and labor (as much as 60% plastic in many cases), and thus is a step which is preferably eliminated. Furthermore, plastic customized with seals may yield large amounts of scrap that can be used to thwart security inventory controls of plastic and permit easy counterfeiting.

U.S. Pat. 3,204,354 of Berger, Incorporated by reference herein, illustrates providing oversized top and bottom sheets which are laminated to the inner data bearing sheet. After lamination the oversized sheets are die cut to produce the final card having chamfered or rounded corners and the precisely controlled dimensions.

The inventor has observed in the market place that die cutting after lamination has always been utilized to produce the final card and believes that no one has utilized sheets having the final requisite configuration of a given predetermined size because flash or edge oozing was always produced due to the adhesive flowing out at the sides of the sandwich under the heat and pressure of lamination, such flash ruining its edge precision and being difficult to remove other than by post-lamination die cutting.

SUMMARY OF THE INVENTION

In accordance with the present invention outer plastic sheets having the dimensions of the finally produced card are laminated to the inner data core sheet by utilizing small quantities of adhesive so that the aforesaid flash is not produced and post-lamination die cutting is eliminated.

SPECIFIC DESCRIPTION OF AN EMBODIMENT OF THE INVENTION

A card is produced by positioning the data-bearing core sheet between a pair of outer plastic protective sheets having a thickness of .002 to .010 inch and comprising polyester terephthalate marketed under the trademark "Mylar" and adding a sparse quantity of a suitable thermally activated adhesive which will not produce flash during lamination. After the application of adhesive the chip of the predetermined size and configuration is subjected to a temperature of 240° to 270° F. and pressure in the neighborhood of 25 pounds per square inch for 3 seconds or more.

The adhesive comprises a medium density polyethylene with or without a heat reactive phenolic such as Riegel HR. The adhesive layer of phenolic is .0003 to .0005 inch thick. The medium density polyethylene adhesive is no greater than .002 inch thick. Both adhesives are applied to each outer plastic sheet. Adhesives are preferred having low viscosity under heat and pressure and yet maintain a high degree of transparency.

The term "rounded" corner is intended to include chamfering or other angular cuts which facilitate card insertion and data collection.

One observes that an excellent card is produced which does not have any of the aforementioned flash, or irregular borders due to oozing of low-melt filler plastic and/or adhesive.

The term adhesive is intended herein to be generic to both the widely utilized polyethylene plastic material and to adhesives such as heat-reactive phenolic. The widely utilized polyethylene material acts as an adhesive particularly in conjunction with porous paper and also functions as a filler in cases where there is uneven spacing or warpage of the top and bottom plastic sheets. The polyethylene material is also utilized to give the card thickness rather than utilizing large quantities of polyester terephthalate ("Mylar"). It may be possible for certain applications to eliminate the polyethylene, particularly where the adhesive produces a good bond.

The term "plastic" is intended to include any substance suitable for functioning as an outer plastic sheet.

I claim:
1. A method for producing a laminated data card which need not be die cut subsequent to lamination, comprising the steps of:
   (a) providing a pair of protective sheets coupled together and having the predetermined configuration and size of the finished laminated data card, said protective sheets having a relatively thin layer of heat-activatable adhesive applied to at least one of the inner faces thereof for preventing said heat-activatable adhesive from being squeezed out of the laminated data card upon the application of laminating heat and pressure thereto, thereby to eliminate subsequent die cutting of the laminated data card;
   (b) inserting a data bearing medium between said sheets; and thereafter;

(c) applying sufficient heat and pressure to said sheets to laminate said sheets and said data bearing medium together.

2. The method of claim 1 wherein said relatively thin layer of heat-activatable adhesive is no thicker than about .002 inch.

References Cited

UNITED STATES PATENTS

| | | | |
|---|---|---|---|
| 3,279,826 | 10/1966 | Rudershausen et al. | 40—2.2 X |
| 3,526,567 | 9/1970 | Macone | 40—2.2 X |
| 2,932,913 | 8/1960 | Hannon | 156—292 X |
| 3,002,854 | 10/1961 | Brill | 156—308 X |
| 3,253,360 | 5/1966 | Spicer | 40—158 |
| 3,418,189 | 12/1968 | Grosheim | 156—335 X |
| 3,481,812 | 12/1969 | Holub et al. | 156—334 X |
| 3,515,616 | 6/1970 | Miyamoto et al. | 156—330 |
| 3,522,126 | 7/1970 | Ptak | 156—334 |

CARL D. QUARFORTH, Primary Examiner

E. A. MILLER, Assistant Examiner

U.S. Cl. X.R.

40—2.2; 156—277